(No Model.)

E. R. INMAN.
COOKING UTENSIL.

No. 587,528. Patented Aug. 3, 1897.

Witnesses
E. W. Reddy
W. L. Pollard

Inventor
Edward Ray Inman

THE NORRIS PETERS CO., PHOTO-LITHO., WASHINGTON, D. C.

UNITED STATES PATENT OFFICE.

EDWARD RAY INMAN, OF JANESVILLE, WISCONSIN.

COOKING UTENSIL.

SPECIFICATION forming part of Letters Patent No. 587,528, dated August 3, 1897.

Application filed December 4, 1895. Serial No. 571,034. (No model.)

*To all whom it may concern:*

Be it known that I, EDWARD RAY INMAN, of the city of Janesville, in the county of Rock and State of Wisconsin, have invented new and useful Improvements in Cooking Utensils; and I do hereby declare the following to be a full, clear, and exact description of said invention, reference being had to the accompanying drawings, and to the letters of reference marked thereon, which form a part of this specification.

My invention relates to improvements in cooking utensils, the object of which is to serve the combined purpose of a griddle and an oven, as necessity or convenience may require, and to economize heat and space, and is designed particularly to be used on gas, vapor, and oil stoves. I claim to attain these objects by the device shown in the accompanying drawings, in which—

Figure 1:
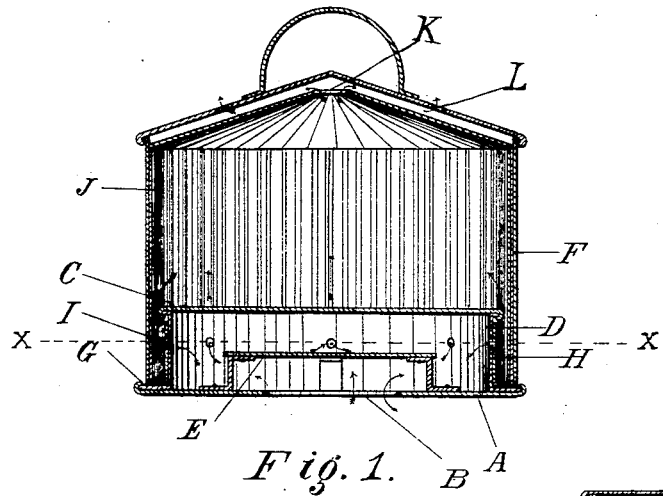
Figure 3:
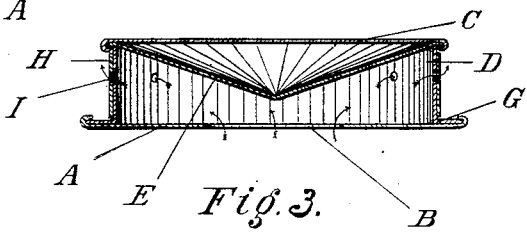
Figure 2:
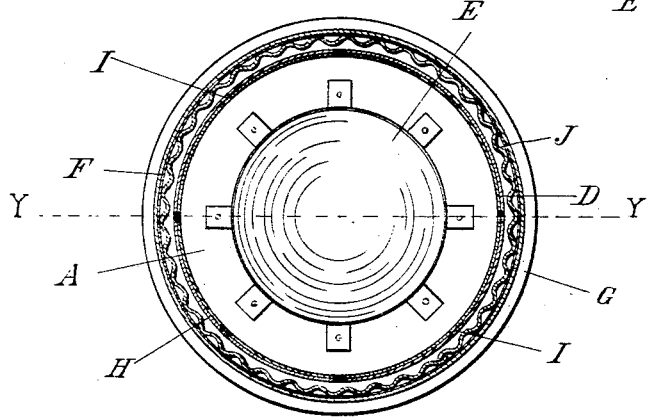

Figure 1 is a central vertical section through the portion indicated by the dotted line $y\ y$ in Fig. 2. The arrows in said Fig. 1 indicate the flow of heat and ventilation. Fig. 2 is a horizontal section of my device through the portion indicated by the dotted line $x\ x$ of Fig. 1. Fig. 3 is a vertical section of the griddle portion of my device and shows a modified form of deflector.

My device, which is made of sheet metal, is composed of a base or griddle which is constructed of the several parts, as follows: a bottom plate A, preferably circular in form, having in the center thereof a hole B for the admission of flame and heat, and an upper plate C, which forms the top or upper surface of the griddle portion of my device, also circular in form. Said top and bottom plates are connected to each other and separated a proper distance apart by means of the band D, which forms the side or rim of the griddle. Above the hole B in the bottom A is placed a deflector E, which is held a short distance above the bottom plate A and serves to deflect or distribute the heat equally about the circumference of the griddle. Plate A, plate C, and the band D are attached together in the manner most usual and convenient in this branch of the metal-worker's art.

To form an oven of my device, I provide a cover or chamber F, also circular in form, horizontally considered, and of a somewhat greater diameter inside than the upper plate of the griddle—enough larger to permit the same to pass loosely down over said plate C and down onto the flange G, which is the lower plate A extended equally in all directions from the periphery of the band D. Said cover or chamber F is high enough to contain sufficient room above the upper surface of the plate C for the practical purpose of receiving and containing food to be cooked.

For the purpose of ventilation and to permit heat to pass from the inside of the griddle up into the chamber above the griddle when the cover F is in place I provide holes I in the band D of the griddle, through which heat may pass between said side D and the edge of the top plate C and the inner surface of the cover F up into the oven, (which is the chamber above the griddle when the cover is in place.)

For the purpose of regulating the flow of heat thus produced I provide an extra collar H, which fits loosely about the band D, the width of which collar may be the distance between the opposing surfaces of the plates A and C, said collar being free to rotate about the band D. Said collar H is provided with perforations corresponding in size, position, and number to those in the band D, and by rotating said collar H to a slight distance the holes I may be closed or the opening varied in amount, as required.

To provide an even space all about said griddle for the passage of heat through said holes I up into the oven, the cover F is lined with a corrugated metal lining J, (shown in Fig. 2,) said corrugations forming spaces for the free passage of heat. I do not wish, however, to limit myself to this particular form of lining, as said lining may be plain and other means provided for equalizing said space—for instance, several lugs extending inwardly from said lining or outwardly from the periphery of the band D.

The lower edge of the cover F sets down upon the flange G and prevents the escape of heat from said oven.

For the purpose of ventilating the cover of my device to permit the escape of steam and vapor arising from the cooking food I provide an aperture K in the top lining of the cover F, and at some location—not opposite the hole K—in the top of the outer shell of said cover I provide several smaller apertures L. The top lining and the top outer shell of said cover being some distance apart steam and vapor is permitted to escape through said apertures, as shown by arrows in Fig. 1. Such ventilation is provided for the purpose of causing food that is being cooked to brown.

Thus it will be understood that when my device is to serve the purpose of a griddle that portion indicated by Fig. 3 only is used, and the holes I are preferably closed entirely, and baking or toasting is accomplished by placing the food upon the upper surface of the plate C, and the cooking process is effected entirely by radiation; further, that when the device is to be used as an oven the complete utensil is used and the cover F is placed over the griddle, the lower edge of said cover setting down upon the flange G, the holes I are opened, and as the heat passes therethrough up into the oven heat is obtained and maintained therein by ventilation, thus forming a complete oven.

Having thus described my device, what I claim as new, and desire to secure by Letters Patent, is—

1. In a cooking utensil, a griddle composed of two plates A and C attached together and held apart from each other by a band D, said bottom plate perforated to admit heat, and above said perforation a deflector to deflect the heat to the circumference of said griddle, in combination with a chambered cover, forming an oven, substantially as shown and described.

2. In a cooking utensil a griddle composed of an upper and a lower plate attached and held apart by a rim or band D, said lower plate having an aperture therein to receive heat, a deflector above said aperture, said band D being perforated to permit the egress of heat out of said griddle, in combination with a detachable chambered cover with a corrugated lining to permit hot air to enter said cover, substantially as shown and for the purpose specified.

3. In a cooking utensil, a base or griddle consisting of an upper and a lower plate, said lower plate having an aperture therein for the reception of flame and heat, said upper and lower plates being attached together and held apart by a band, which band is perforated, bearing upon its periphery a sliding counterpart, as a means of controlling the egress of heat from said griddle, a deflector within said griddle, as shown, in combination with a removable, chambered, ventilated cover all substantially as shown and for the purpose specified.

In testimony whereof I affix my signature in presence of two witnesses.

EDWARD RAY INMAN.

Witnesses:
W. A. JACKSON,
W. F. WILLIAMS.